United States Patent Office 3,651,150
Patented Mar. 21, 1972

3,651,150
PREPARATION OF DI-ALKYLAROMATIC
DISULFIDES
George H. Garrison, Andrew G. Horodysky, and Howard E. Philips, Beaumont, Tex., assignors to Mobil Oil Corporation
No Drawing. Filed Feb. 26, 1969, Ser. No. 802,663
Int. Cl. C07c 149/30
U.S. Cl. 260—608
20 Claims

ABSTRACT OF THE DISCLOSURE

Reacting free sulfur with an aqueous alkali metal hydrosulfide (NaHS) solution, optionally having a minor monosulfide ($Na_2S$) content, to convert some of the hydrosulfide and most of any monosulfide present to the alkali metal disulfide ($Na_2S_2$); thereafter adding benzyl chloride or a similar haloalkylaromatic compound for accelerated and substantially complete conversion by the initial reaction products in the presence of methanol to form benzyl mercaptan and dibenzyl disulfide; adding a strong base (NaOH) after complete conversion of the benzyl chloride to raise the pH of the reaction mixture to about 10–11 to supplement the effect of the methanol in accelerating the reaction between the mercaptan and the sulfur in completing the formation of dibenzyl disulfide.

BACKGROUND OF THE INVENTION

Field of the invention

This invention relates to improved processes for preparing di-alkylaromatic disulfides in the presence of a water-miscible alcohol from substituted and unsubstituted aralkyl halides, sulfur, and a solution of an alkali metal hydrosulfide alone or in admixture with an alkali metal monosulfide.

Prior art

Moran et al. Pat. 2,113,092 discloses the preparation of dibenzyl disulfide by first dissolving sodium sulfide and sulfur in water by agitation and heating followed by the addition of benzyl chloride either alone or in admixture with certain water-immiscible solvents. Improved yields and production capacity, savings in time and materials and less processing are described for that method in comparison with an earlier process employing 95% ethanol as the reaction medium. However, it has been found that the product of this patented process generally has a pink color whereas a white product of higher purity is preferred for at least some purposes, as exemplified by its use as an extreme pressure additive in lubricants.

Dibenzyl disulfide has also been prepared from sodium hydrosulfide and Olin et al. Pat. 2,349,191 sets forth a process wherein the benzyl chloride is first converted into the corresponding mercaptan by reaction with an excess of aqueous sodium hydrosulfide at elevated temperatures followed by a second stage in which sulfur is added to convert the mercaptan into the dibenzyl disulfide. Both of these reactions are quite slow; and despite general remarks in that patent of reaction periods of 1 to 5 hours each, it is noteworthy that Example I describes a total initial reaction time of nearly 9 hours for adding and digesting the benzyl chloride after the hydrosulfide solution had been preheated to reaction temperature, and that a total final reaction period of 9 hours is allowed for charging and reacting sulfur even though the excess sodium hydrosulfide is said to serve as a catalyst in that stage. Thereafter sodium hydroxide is added in connection with a vacuum distillation to eliminate unreacted benzyl compounds.

The present invention is based upon the discovery that such organic disulfides may be obtained in considerably shorter overall reaction times by means of a novel and improved procedure even though three distinct reaction stages are involved. The content of higher organic polysulfide by-products in the product is extremely low, for the reaction conditions apparently either inhibit their formation or decompose them subsequently. This process permits the use of refinery hydrosulfide waste streams for greater economy as well as a sizable charge of sodium monosulfide in producing high yields of a product of excellent color and purity which also displays very low corrosion in the copper strip test as a result of its low organic polysulfide content.

SUMMARY OF THE INVENTION

The procedure of the present invention involves reacting a mixture of an alkali metal hydrosulfide in aqueous solution with free sulfur for a period sufficient to convert at least a substantial proportion of said hydrosulfide to the alkali metal disulfide; thereafter introducing and reacting a haloalkylaromatic compound with the resulting reaction products for a period sufficient to convert substantially all of said haloalkylaromatic compound and form a di-alkylaromatic disulfide and an alkylaromatic mercaptan; thereafter adding a sufficient quantity of a relatively strong base to raise the pH of the reaction mixture above about 9.5 for a period sufficient for a reaction with free sulfur in the presence of a water-miscible alcohol to convert substantially all of said alkylaromatic mercaptan into said di-alkylaromatic disulfide, and separating the di-alkylaromatic disulfide from the reaction mixture.

Other aspects of the invention relate to the incorporation of an alkali metal monosulfide also into the initial reaction mixture and the conversion of at least a major proportion of this substance into the alkali metal disulfide, and further to preferred types and species of reactants and other agents utilized in the process as well as certain proportions thereof.

DESCRIPTION OF SPECIFIC EMBODIMENTS

While the following description is concerned largely with the production of dibenzyl disulfide as a compound of substantial commercial importance, and preferably by using the least expensive available reactant materials as exemplified by a petroleum refinery waste stream composed essentially of sodium hydrosulfide in aqueous solution, it is to be understood that the present invention encompasses numerous equivalents and modifications.

For example, the hydrosulfides and sulfides of other alkali metals, as illustrated by potassium and lithium, may be employed instead of the less expensive sodium compounds; and similarly any relatively strong, water-soluble base such as lithium hydroxide, potassium hydroxide, and ammonium hydroxide may be utilized as a matter of choice instead of the preferred sodium hydroxide for increasing the alkalinity of the reaction mixture during its final stage.

In like manner, the invention is not limited to benzyl chloride as the haloalkylaromatic reactant for a wide variety of other unsubstituted and substituted aralkyl-halides may be utilized for forming the corresponding di-alkylaromatic disulfides provided that none of the substituent radicals or atoms are reactive with any other substances present in the reaction mixture under the various reaction conditions and thus do not interfere with the synthesis of the desired organic disulfides. For illustration, suitable reactants include inter alia, benzyl bromide, benzyl iodide, alpha-chloroethyl benzene, p-xylyl chloride (also the bromide and iodide), m-xylyl chloride (also the bromide and iodide), as well as o-xylyl halides and other alkylbenzyl halides as exemplified by p-ethylbenzyl chloride, bromide and iodide. In general, haloalkyaromatic reactants for the process may be designated by the type formula:

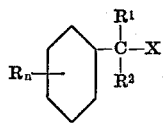

where $n$ represents an integer of from 0 to 5, each R individually represents a nuclear substituent of the group consisting of alkyl, cycloalkyl and aryl, radicals and chlorine, bromine or iodine atoms; $R^1$ and $R^2$ each designates a hydrogen atom or a hydrocarbyl radical (alkyl, aralkyl or aryl) containing from 1 to 10 or more carbon atoms; and X designates a chlorine, bromine or iodine atom. These reactants may also be described as haloalkylbenzenoid compounds useful in forming the corresponding di-alkylbenzoid disulfides.

Among the alcohols suitable for use in the present invention are methanol, ethanol, propanol, isopropanol, sec-butanol, isobutanol and tertiary butanol.

The instant process and the sequence of reactions therein may desirably be illustrated with reference to a series of equations. In the initial reaction stage, an alkali metal hydrosulfide is converted to a substantial extent into the alkali metal disulfide by reaction in aqueous solution with free or elemental sulfur at elevated temperatures of the order of 110 to 250° F., and preferably between about 170 and 190°, and these temperature ranges are suitable for the entire series of reactions unless otherwise indicated. The aforesaid reaction is relatively fast and proceeds according to the equation:

(1) $\quad 2MHS + S \rightarrow M_2S_2 + H_2S\uparrow$ in which M represents an alkali metal. The evolution of hydrogen sulfide, which is initially quite rapid, furnishes a convenient measure of the progress of the reaction, and the sulfur content of this gas may be recovered in a caustic soda scrubber. While a major proportion of the hydrosulfide is usually converted to the disulfide, it appears from the later formation of a mercaptan that this reaction seldom, if ever, goes to completion at least within the relatively short reaction times of typically 10 to 40 minutes which are desirable in commercial operations. Nevertheless, the partial conversion of the hydrosulfide at this stage is important as it has been found to accelerate reaction (4) hereinafter.

The hydrosulfide charge solution often contains a small amount of the monosulfide of the alkali metal, for example a typical waste stream from a petroleum refinery caustic soda scrubber may contain about 10 to 25% by weight of sodium hydrosulfide and about 0.1 to 10% disodium monosulfide. In addition, it is often desirable from a standpoint of economy to recycle a stream of $Na_2S$ in water as may be obtained by employing a caustic soda scrubber in the instant process to prevent the escape of hydrogen sulfide liberated in reaction (1). With such a mixture, an endothermic reaction occurs in the initial stage as sulfur reacts with the alkali metal monosulfide to form the disulfide in the following manner:

(2) $\quad M_2S + S \rightarrow M_2S_2$

This reaction proceeds to substantial completion in a brief period which is advantageous inasmuch as any remaining alkali metal monosulfide would later be converted into dibenzyl monosulfide or a similar organic monosulfide as an unwanted by-product in a rapid and irreversible reaction. In employing an initial charge of such mixed sulfides for the sulfur treatment, it is usually preferable to charge between about 5 and 80 parts of the metal monosulfide per 100 parts by weight of the alkali metal hydrosulfide as it has been found that larger amounts of the monosulfide inhibit the completion of reaction (2) and moreover produce a pronounced pink coloration in the case of a benzyl disulfide final product.

When the evolution of $H_2S$ in the initial reaction subsides considerably, usually about 10 to 30 minutes after starting to add sulfur to the stirred and preheated (170 to 190° F.) aqueous charge solution, a water-miscible alcohol may be added then or in the final reaction stage described hereinafter. Although the alcohol may be present in the initial reaction mixture, this practice is not generally recommended since the early addition apparently produces no significant benefits and the rapid evolution of $H_2S$ tends to strip the alcohol from the solution at a rate that may exceed the condensing capacity of a typical reflux column with an attendant unnecessary loss of the alcohol.

Next, the benzyl chloride or other haloalkylaromatic compound is added with continued stirring of the initial reaction product mixture while the reactor and the usual reflux column are cooled by conventional means sufficiently to prevent the loss of the alcohol and of too much water in the highly exothermic reactions that ensue. For example, it is usually preferable to hold the reaction temperature to a maximum of about 193° F. when methanol is present or to about 210° F. when isopropanol is employed in an atmospheric pressure reaction, but considerably higher temperatures ranging up to about 250° F. are suitable when operating at elevated pressures in appropriate equipment. At the time the addition of the aromatic reactant is started, the combined sulfur in the reaction solution is predominantly present as the alkali metal disulfide along with a substantial amount of the hydrosulfide and a relatively small quantity of the monosulfide of the alkali metal. Several reactions occur during this reaction stage, and the principal one proceeds in the following manner.

(3) $\quad 2BzX + M_2S_2 \rightarrow Bz-S-S-Bz + 2MX$ wherein Bz represents a substituted or unsubstituted aralkyl radical in the organic compound described hereinbefore and exemplified in the structural type formula set forth earlier and X designates a chlorine, bromine or iodine atom. This is a fast reaction and a major proportion of the desired organic disulfide product is formed at this time. In addition, any alkali metal monosulfide present at this time quickly reacts with the haloalkylaromatic compound to form the corresponding organic monosulfide as an unwanted by-product; hence, it is generally preferable not to add the organic halide until after the conversion of any alkali metal monosulfide has proceeded as far as possible in the initial reaction stage.

The haloalkylaromatic compound also reacts with the unconverted alkali metal hydrosulfide in the reaction mixture according to the following equation.

(4) $\quad BzX + MHS \rightarrow BzHS + MX$

While this reaction is usually very slow and frequently incomplete, it proceeds considerably faster than the normal rate under the present reaction conditions wherein the reaction mixture contains a substantial amount of the alkali metal disulfide. In addition, the reaction mixture now has two liquid phases and it appears desirable to have the alcohol in the reaction mixture at this time for it is possible that a mutual solubility effect may be attributed to the alcohol that may also contribute somewhat to increasing the reaction rate; but the evidence on this is inconclusive, and the indications are that the presence of the alkali metal disulfide in the reaction mixture is far more important in accelerating this reaction. As a result, it is possible to obtain complete conversion in the case of benzyl chloride within about 50 minutes all of the benzyl chloride has been added under reflux conditions, and even shorter periods are sufficient when higher temperatures and elevated pressures are utilized. During this stage, the concentration of alkylaromatic mercaptan in the organic phase of the reaction mixture often reaches 15–

20% and some conversion of the mercaptan into the desired produce takes place in the manner described in Equation 5 hereinafter, but this reaction is quite slow at the existing relatively neutral pH of about 6 to 8.

For all practical purposes, the final reaction stage begins with the addition of a relatively strong base, such as sodium hydroxide dissolved in water or a lower aliphatic alcohol or other solvent miscible with the aqueous phase of the reaction mixture, to raise the pH of the mixture above about 9.5, and preferably to between 10 and 11; higher pH levels may also be employed. The mercaptan then reacts to form more of the desired organic disulfide in the following reaction with free sulfur, usually the residue from the original charge, otherwise the necessary quantity of sulfur may be introduced at this time.

(5) 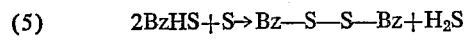

The alkali solution should preferably be added only after the conversion of the alkylbenzoid halide is essentially complete, because the alkali reacts with any alkali metal hydrosulfide (either present in excess or remaining unreacted as a result of incomplete conversion of the organic halide) and this reaction converts the hydrosulfide to the alkali metal monosulfide which in turn reacts with any unreacted organic halide present to form the undesired di-alkylaromatic monosulfide. The latter reaction is considerably faster than that of Equation 5 and thus interferes with the production of the disulfide product.

Under conventional conditions, reaction (5) proceeds very slowly over a period of hours but this reaction may be accelerated in accordance with the present process to reduce the reaction time to as little as about 30 minutes when the reaction mixture contains a lower aliphatic alcohol and has a pH of at least about 9.5 and preferably about 10–11. The alcohol may be introduced either before or after adjusting the pH of the mixture but it is advantageous to incorporate the alcohol into the mixture prior to adding the alkaline agent to minimize the reaction time in the final stage. There is no need to refrain from adding the alcohol until the organic halide conversion is complete because the alcohol has no deleterious effects on that conversion and may provide a beneficial mutual solvent action in that conversion. It has been found that the alcohol promotes or catalyzes the conversion of the mercaptan to the disulfide product to a degree which, within limits, is proportional to the concentration of alcohol in the reaction mixture. In general, the concentration of alcohol may desirably range between about 5 and 40% of the total volume of the reaction mixture and a concentration of about 8 to 20% is usually preferred for large scale commercial operations.

The reaction mixture is heated again, at least during the latter part of the final stage reaction, to further increase the reaction rate by raising the temperature from about 190 to 210° F. in case of an aqueous methanol reaction medium refluxing at atmospheric pressure; then the heating is continued to the extent necessary to distill off the methanol or other alcohol from the reaction mixture. The alcohol is customarily trapped off in the condenser for reuse. Although a considerable amount of hydrogen sulfide is formed in the final stage reaction, little or none of it is released as a gas for substantially all of it is retained in the reaction mixture, probably by reacting with sodium hydroxide or other alkali therein.

Upon allowing the reaction mixture to stand and cool without agitation, it separates into two liquid phases. After draining off the lower phase containing an aqueous salt solution, the organic layer is found to have typical contents of less than 0.1% by weight of both the haloalkylaromatic starting material and the alkylaromatic mercaptan. The organic phase is purified in conventional manner by repeated washing at elevated temperatures with aqueous alkali solutions followed by hot water washes.

The products obtainable by the present process are characterized by an excellent yield and color as well as a low content of the organic monosulfide. The white dibenzyl disulfide product has a high melting point of typically 65° C. or slightly higher, and it has been incorporated in extreme pressure lubricants which displayed superior seizure resistance values.

Analytical evidence indicates the dibenzyl disulfide produced according to the present invention contains little or no organic polysulfide compounds having 3 or more sulfur atoms per molecule, and there is reason to believe that at least some of the polysulfides degrade the copper strip ratings of dibenzyl disulfide considerably. Accordingly, the substantial absence of organic polysulfides in the present products constitutes an additional advantage. It is also a surprising result inasmuch as free sulfur tends to react readily with sodium disulfide in aqueous solution to form sodium polysulfides ($Na_2S_3$, etc.) which in turn are reactive with benzyl chloride to form organic polysulfides. While the substantial elimination of these unwanted by-products in the instant process is not yet fully understood it may be postulated that the presence of sodium hydrosulfide throughout the initial reaction stage exerts some effect which inhibits a reaction between the sodium disulfide produced and the remaining sulfur, and/or that the sodium hydroxide added in the final reaction stage tends to remove combined sulfur from any organic polysulfides that may have been formed earlier and perhaps convert such polysulfides into dibenzyl disulfide. However, the present invention should not be construed as bound by any such theories as to its operation.

While the instant method is described in detail herein with reference to procedures of the batch type, it may also be adapted to continuous process operations.

For a better understanding of the nature, objects and benefits of this invention, reference should be had to the following illustrative examples designated by numerals as well as Comparative Example A. The examples are set forth for purposes of exemplification rather than limitation on the scope of the invention. All temperatures are expressed as degrees Fahrenheit (° F.) and all proportions in terms of weight throughout this specification unless otherwise specified.

EXAMPLE 1

A refinery waste stream comprising essentially an aqueous solution of sodium hydrosulfide with a much smaller content of sodium monosulfide filtered to remove a very small content of metal sulfides and then thoroughly mixed with a smaller proportion of an aqueous solution of essentially sodium monosulfide returned from the caustic scrubber described hereinafter. This blended material is preheated to a temperature of 180° F. and charged to a reactor equipped with a jacket for heating or cooling media, an agitator and a reflux condenser connected to a scrubbing device in which aqueous caustic soda is utilized to prevent the escape of hydrogen sulfide. The 6750 pounds or 695 gallons of solution introduced with a content of 16.0 weight percent sodium hydrosulfide and 8.0 weight percent sodium monosulfide is equivalent to 32.7 mols (1830 pounds) of sodium hydrosulfide or a 5 percent excess for the purposes of the present reactions. 508 pounds (15.9 mols) of sulfur, a 2 percent excess on the overall stoichiometric requirements, are added rapidly to the vessel and the evolution of $H_2S$ at a high rate immediately ensues. After about 15 minutes, the liberation of $H_2S$ is greatly reduced and this reaction is allowed to proceed for another 15 minutes with steam flowing through the reactor jacket to maintain the reaction temperature in the 175–180° F. range while methanol is introduced in a quantity sufficient to provide a total of 1154 pounds or 175 gallons of methanol with due allowance for the minor methanol content of the recycled sodium monosulfide solution in the charge. A high degree of conversion of $Na_2S$ to $Na_2S_2$ occurs and the release of $H_2S$ in such volume indicates that a major part of the NaHS is similarly converted to $Na_2S_2$ in the aforesaid reaction.

Next, with stirring continuing, 3940 pounds (430 gallons) or 31.1 mols of benzyl chloride are added to the slightly acidic reaction mixture at a rate which happens to be restricted by the heat removal capacity of the reactor and condenser employed and amounts to 8 to 10 gallons per minute over a period of 53 minutes while cooling to hold the temperature of this exothermic reaction to a maximum of 193° F. followed by a holding period of about 50 minutes to allow ample time for substantially complete conversion of the benzyl chloride. During this period the sodium disulfide as well as any remaining sodium monosulfide react rapidly in forming dibenzyl disulfide and monosulfide, respectively. The slower reaction of benzyl chloride with the remaining NaHS to form benzyl mercaptan is also essentially complete, and some of the benzyl mercaptan is oxidized to dibenzyl disulfide by the free sulfur remaining in the reaction mixture. During this period, the benzyl mercaptan concentration reaches 15 to 20 percent of the organic phase of the heterogeneous reaction mixture before the latter reaction with sulfur proceeds to any substantial extent.

In the next stage, 30 gallons of a 50 percent aqueous sodium hydroxide with a content of 190 pounds of NaOH are added to raise the pH of the reaction mixture to 10.5 and heating is started to raise its temperature to 200° F. during the next 50 minutes. The conversion of benzyl mercaptan to benzyl disulfide is quickly completed in this basic reaction medium of substantial alcoholic content. While $H_2S$ is formed in this reaction also, most or all of it is retained in the liquid reaction mixture rather than being liberated as a gas. Following this, the reaction mixture is further heated to a temperature of 207° F. to distill the methanol which is now trapped off in the reflux condenser instead of being returned to the reaction vessel. Premature addition of the caustic soda solution, as when there are substantial concentrations of benzyl chloride and NaHS in the reactor, is avoided as this will convert the NaHS to $Na_2S$ which reacts more rapidly with the benzyl chloride and thus produces an increased proportion of the undesired dibenzyl monosulfide in the product.

Heating and agitation are discontinued and the reactor contents are allowed to settle and separate into two layers whereupon the lower brine phase is drawn off to a guard tank for the recovery of any organic material therein and then discharged as waste. The upper organic phase is transferred to a wash tank equipped for suitable agitation where it is washed with an equal volume of 20 percent aqueous sodium hydroxide solution for one hour at 200° F. to remove any traces of unreacted sulfur and benzyl mercaptan. The organic phase is subjected to another such washing with 6 percent caustic soda solution to remove any contaminants which tend to form emulsions. Next, the batch is washed 3 times with equal volumes of water at 195–200° F.; then dried at 220° F. under a subatmospheric pressure of 125 mm. of mercury and flaked on a continuous drum flaker.

The resulting white flakes have a melting point of 65° C. and a content of about 2 percent dibenzyl monosulfide and 0.2 percent of other impurities, including less than 0.1 percent each of benzyl chloride and benzyl mercaptan. The yield amounts to 95 percent on the basis of benzyl chloride charged.

EXAMPLE 2

The procedure of Example 1 is repeated with 1154 pounds of isopropanol substituted for the methanol. Due to its lower volatility, 20° F. higher reaction temperatures are employed. The isopropanol is eventually distilled off as an azeotrope with water at a temperature ranging up to 205° F., but the temperature is kept below 212° F. to avoid excessive carryover of water. The yield and purity of the dibenzyl disulfide produced are similar to the results obtained in Example 1.

Comparative Example A

The procedure of Example 1 is repeated with a similar charge stream under substantially the same conditions except for the omission of methanol from the reaction mixture and for a smaller addition of the 50 percent aqueous sodium hydroxide solution raising the pH of the reaction mixture to the order of 10 in the final reaction.

The resulting crude product is found to contain about 7 percent of benzyl mercaptan prior to washing with aqueous caustic soda. The excessive content of this impurity is indicative of an incomplete oxidation of benzyl mercaptan to dibenzyl disulfide. At extra processing expense, the mercaptan can be eliminated by employing at least one extra caustic washing operation with a corresponding reduction in yield.

EXAMPLE 3

The procedure of Example 1 is repeated under essentially the same reaction conditions except for employing a refinery waste stream containing more sodium hydrosulfide and a much lower sodium monosulfide content. This aqueous solution contains 23.1 percent NaHS and 2.63 percent $Na_2S$, which is equivalent to a total of 26.9 percent NaHS by weight; and the quantities of the reactants are adjusted on the basis of the 26.9 percent NaHS equivalent to provide the same reactant ratios as before.

White dibenzyl disulfide is obtained in a yield similar to Example 1 and with a content of only 1.6 percent of benzyl monosulfide, less than 0.1 percent benzyl chloride and less than 0.1 percent benzyl mercaptan. An excellent rating of 1A is obtained upon subjecting this material to the A.S.T.M. copper strip corrosion test.

While specific embodiments of the invention have been set forth in detail hereinbefore for the purpose of providing a complete disclosure of the invention, it will be apparent to those skilled in the art that many variations and modifications of the procedures may be made within the purview of this invention. Accordingly, the present invention should not be regarded as restricted in any particulars except as may be recited in the appended claims or required by the prior art.

What is claimed is:

1. A process which comprises a series of reactions at temperatures of from 110 to 250° F. which include reacting a mixture of an alkali metal hydrosulfide in aqueous solution with free sulfur for a period sufficient to convert at least a substantial proportion of said hydrosulfide to the alkali metal disulfide; thereafter reacting the resulting reaction products with a monocyclic haloalkylaromatic compound having a halogen atom of the group consisting of chlorine, bromine and iodine attached to the alpha carbon atom of the alkyl radical therein to form a di-alkylaromatic disulfide and an alkylaromatic mercaptan; then, after substantial completion of said reaction of said haloalkylaromatic compound, adding a sufficient quantity of a relatively strong base to raise the pH of the reaction mixture above about 9.5 for a period sufficient for a reaction with free sulfur in the presence of a water-miscible alcohol to convert said alkylaromatic mercaptan into said di-alkylaromatic disulfide, and separating the di-alkylaromatic disulfide from the reaction mixture.

2. A process according to claim 1 in which said alcohol is also present during said reaction of said haloalkylaromatic compound.

3. A process according to claim 1 in which said hydrosulfide is sodium hydrosulfide.

4. A process according to claim 1 in which said haloalkylaromatic compound is a benzyl halide.

5. A process according to claim 1 in which said alcohol is methanol.

6. A process according to claim 1 in which said base is an alkali metal hydroxide.

7. A process according to claim 1 in which said haloalkylaromatic compound is benzyl chloride and the product is dibenzyl disulfide.

8. A process according to claim 6 in which said hydrosulfide is sodium hydrosulfide, and said base is sodium hydroxide.

9. A process according to claim 7 in which the quantity of sodium hydroxide is sufficient to raise the pH of the reaction mixture to between about 10 and 11.

10. A process according to claim 8 in which methanol is present in a quantity between about 5 and 40% of the total volume of the reaction mixture.

11. A process which comprises a series of reactions at temperatures of from 110 to 250° F. which include reacting a mixture of an alkali metal monosulfide and an alkali metal hydrosulfide in aqueous solution with free sulfur for a period sufficient to convert at least a substantial proportion of said hydrosulfide and at least a major proportion of said monosulfide to the disulfide of said alkali metal; thereafter reacting the resulting reaction products with a monocyclic haloalkylaromatic compound having a halogen atom of the group consisting of chlorine, bromine and iodine attached to the alpha carbon atom of the alkyl radical therein to form a di-alkylaromatic disulfide and an alkylaromatic mercaptan; then, after substantial completion of said reaction of said haloalkylaromatic compound, adding a sufficient quantity of a relatively strong base to raise the pH of the reaction mixture above about 9.5 for a period sufficient for a reaction with free sulfur in the presence of a water-miscible alcohol to convert said alkylaromatic mercaptan into said di-alkylaromatic disulfide, and separating the di-alkylaromatic disulfide from the reaction mixture.

12. A process according to claim 11 in which said alcohol is also present during said reaction of said haloalkylaromatic compound.

13. A process according to claim 11 in which said alkali metal is sodium.

14. A process according to claim 11 in which said haloalkylaromatic compound is a benzyl halide.

15. A process according to claim 11 in which said alcohol is methanol.

16. A process according to claim 11 in which said base is an alkali metal hydroxide.

17. A process according to claim 11 in which said haloalkylaromatic compound is benzyl chloride and the product is dibenzyl disulfide.

18. A process according to claim 17 in which an initial mixture of between about 5 and 80 parts of sodium monosulfide and 100 parts by weight of sodium hydrosulfide are reacted with sulfur, and said base is sodium hydroxide.

19. A process according to claim 18 in which the quantity of sodium hydroxide is sufficient to raise the pH of the reaction mixture to between about 10 and 11.

20. A process according to claim 19 in which methanol is present in a quantity between about 5 and 40% of the total volume of the reaction mixture.

References Cited

UNITED STATES PATENTS

| | | | |
|---|---|---|---|
| 2,185,009 | 12/1939 | Babcock et al. | 260—608 |
| 2,349,191 | 5/1944 | Olin et al. | 260—608 |

JOSEPH REBOLD, Primary Examiner

D. R. PHILLIPS, Assistant Examiner

U.S. Cl. X.R.

260—609 D